(12) United States Patent
Cooper et al.

(10) Patent No.: US 7,682,654 B2
(45) Date of Patent: Mar. 23, 2010

(54) FUSED NANOSTRUCTURE MATERIAL

(75) Inventors: Christopher H. Cooper, Windsor, VT (US); Alan G. Cummings, Hartland, VT (US)

(73) Assignee: Seldon Technologies, LLC

( * ) Notice: Subject to any disclaimer, the term of this patent is extended or adjusted under 35 U.S.C. 154(b) by 680 days.

(21) Appl. No.: 10/859,346

(22) Filed: Jun. 3, 2004

(65) Prior Publication Data

US 2004/0247808 A1     Dec. 9, 2004

Related U.S. Application Data

(60) Provisional application No. 60/474,925, filed on Jun. 3, 2003.

(51) Int. Cl.
*B05D 1/36* (2006.01)
*C04B 33/34* (2006.01)
*D01F 9/12* (2006.01)

(52) U.S. Cl. ............... 427/201; 427/180; 427/243; 156/89.26; 156/275.5; 264/413; 423/447.1; 423/447.2; 423/447.3; 977/742; 977/745; 977/842; 977/844

(58) Field of Classification Search ............ 423/447.1, 423/447.2, 447.3, 445 B; 427/180, 243, 427/244, 201; 977/742, 745, 842–844; 156/89.26, 156/275.5; 264/413
See application file for complete search history.

(56) References Cited

U.S. PATENT DOCUMENTS

| | | | | |
|---|---|---|---|---|
| 6,099,965 | A * | 8/2000 | Tennent et al. | ............ 428/408 |
| 6,746,627 | B2 * | 6/2004 | Niu et al. | ............ 252/511 |
| 7,074,310 | B2 * | 7/2006 | Smalley et al. | ............ 204/450 |
| 2002/0172639 | A1 | 11/2002 | Horiuchi et al. | |
| 2005/0260355 | A1 * | 11/2005 | Weber et al. | ............ 427/566 |
| 2006/0032329 | A1 * | 2/2006 | Rubinstein et al. | ............ 75/255 |

FOREIGN PATENT DOCUMENTS

| WO | WO 97/32571    | 9/1997 |
| WO | WO 97/43116    | 11/1997 |
| WO | WO 01/07694 A1 | 2/2001 |
| WO | WO 01/30694 A1 | 5/2001 |
| WO | WO 02/060812 A2 | 8/2002 |
| WO | WO 03/004740 A1 | 1/2003 |
| WO | WO 03/025493 A1 | 3/2003 |

OTHER PUBLICATIONS

Wikipedia defination of "scrim", no date.*
Jyh-Ming Ting et al., "Multijunction Carbon Nanotube Network," *Applied Physics Letters, American Insitute of Physics*, vol. 80, No. 2, Jan. 14, 2002, pp. 324-325.
B.Q. Wei et al., "Carbon Nanotube-Magnesium Oxide Cube Networks," *Journal of Nanoscience and Nanotechnology, American Scientific Publishers US*, vol. 1, No. 1, Mar. 2001, pp. 35-38.
Alan M. Cassell et al., "Carbon Nanotube Networks by Chemical Vapor Deposition," *Applied Physics Letters, American Insitutue of Physics*, vol. 82, No. 5, Feb. 3, 2003, pp. 817-819.
M. Terrones et al., "Exploring the Carbon Nanocosmos: Doped Nanotubes, Networks, and Other Novel Forms of Carbon," *Proceedings of the Spie-Int. Soc. Opt. Eng USA*, vol. 5118, 2003, pp. 1-13.

\* cited by examiner

*Primary Examiner*—Donald Loney
(74) *Attorney, Agent, or Firm*—Finnegan, Henderson, Farabow, Garrett & Dunner LLP

(57) ABSTRACT

Disclosed herein is a nanostructured material comprising carbon nanotubes fused together to form a three-dimensional structure. Methods of making the nanostructured material are also disclosed. Such methods include a batch type process, as well as multi-step recycling methods or continuous single-step methods. A wide range of articles made from the nanostructured material, including fabrics, ballistic mitigation materials, structural supports, mechanical actuators, heat sink, thermal conductor, and membranes for fluid purification is also disclosed.

28 Claims, No Drawings

FUSED NANOSTRUCTURE MATERIAL

This application claims the benefit of domestic priority to U.S. Provisional Patent Application Ser. No. 60/474,925 filed Jun. 3, 2003, which is herein incorporated by reference in its entirety.

The present disclosure relates to a nanostructured material comprising carbon nanotubes fused together to form a three-dimensional material, and a method of making such a material.

Most two-dimensional materials, such as webs, sheets, and the like, have inherent shortcomings to their material properties. While metals and plastic have long been favorites because of their wide range of versatility, for many applications higher strength, higher conductivity, and overall higher performing materials are needed. While the need for such exotic materials used to be confined to high tech applications like space exploration and electronics, they are becoming increasingly important for mass applications in ballistic mitigation applications (such as bulletproof vests), heat sinks, air conditioning units, computer casings, car bodies, aircraft wings and parts, and many other applications that cannot tolerate the high cost of current high performing materials.

For example, one only need read the daily paper to understand the urgent requirement for a protective material for addition to lightly or unarmored military vehicles in service through out the world. Combatant's lives are being lost, virtually every day and many of these losses are directly attributable to the explosive force of buried munitions, triggered by remote control, when a vehicle passes over the buried device. Military requirements call for the creation of new light weight body armor for combatants. New materials are sought for protection of structures and building from blast forces. Similarly, air transport requires blast protection for cargo hold containers transporting freight, or for fuselage protection transporting people.

Current armor protection materials are either unavailable due to great demand for individual body armor, and/or are too heavy or too expensive for the service vehicles.

Recent advances in materials science and nanotechnology have made the creation of a new class of materials possible; materials with strength to weight ratios never before achieved. The carbon nanotube, discovered in the early 1990's, has been widely touted as the next major molecule for use in a nanocomposite material. Scientists studying the material properties of carbon nanotubes assert that this new nanomolecular material is the strongest material known to man. The enormous theoretical strength properties of the carbon nanotube have not, prior to the Inventor's work, been realized.

As discussed in "SUPER-TOUGH CARBON-NANO-TUBE FIBRES," Alan B. Dalton et al, Nature, Volume 423, Page 703, 12 Jun. 2003, Nature Publishing Company, which is herein incorporated by reference, single wall carbon nanotube based composite have demonstrated energy of rupture 20 times of that for Kevlar® based composites. Due in part to the much stronger bonding between the nanotubes associated with the inventive process, the energy of rupture of the inventive material is expected to be greater than that previously reported.

Accordingly, creating materials, such as a cloth and composites that comprises ultra-strong carbon nanotubes fused together to form a highly cross-linked network would be useful for any application requiring high strength, high thermal conductivity, electrical conductivity, and other applications where carbon nanotubes have shown themselves to be superior materials.

Accordingly, the present disclosure relates to a nanostructured material composed of fused carbon nanotubes and methods of making such a material. The properties associated with such a material leads to a range of beneficial properties such as ultra-high tensile strength, acceptable flexibility and good thermal conductivity and electrical conductivity.

SUMMARY OF THE INVENTION

The following disclosure describes a nanostructured material comprising carbon nanotubes fused together to form a three-dimensional structure. Nanotubes described herein generally have an average diameter in the inclusive range of from 1-60 nm and an average length in the inclusive range of from 0.1 µm to 250 mm.

As used herein the term "fused," "fusion," or any version of the word "fuse" is defined as the bonding of nanotubes at their point or points of contact. For example, such bonding can be Carbon-Carbon chemical bonding including $sp^3$ hybridization or chemical bonding of carbon to other atoms.

In the most general sense, the method of making the nanostructured material described herein comprises
- dispersing nanotubes in an appropriate fluid, with or without surfactants, to form a nanotube aliquot,
- depositing the nanotube aliquot onto a porous substrate in an amount sufficient to obtain a substantially stable interlocking monolithic structure, and
- fusing the carbon nanotubes together to form a three dimensional nanostructure.

In one aspect, the method comprises a multi-step recycling method of making a three-dimensional nanostructure, comprising
(1) growing carbon nanotubes in a reactor;
(2) fusing the grown nanotubes to form a three dimensional nanostructure;
(3) performing a catalytic procedure on the three-dimensional nanostructure;
(4) repeating (1) to (3) for a time sufficient to achieve a desired thickness or property for the three-dimensional nanostructure.

In another aspect, the method comprises a continuous method of making a three-dimensional nanostructure material, the method comprising growing carbon nanotubes, in situ, and fusing the grown carbon nanotubes substantially simultaneously with the growing process.

DETAILED DESCRIPTION OF THE INVENTION

As stated, the present invention relates to a nanostructured material comprising carbon nanotubes fused together to form a three-dimensional structure. In one aspect of the present disclosure, the nanostructured material comprises defective carbon nanotubes chosen from impregnated (which is defined as other atoms or clusters inserted inside of nanotubes), functionalized (which is defined as bonding atoms or chemical groups to the surface of the nanotubes), doped (which is defined as the presence of atoms, other than carbon, in the nanotube crystal lattice), charged (which is defined as the presence of non-compensated electrical charge, in or on the surface of the carbon nanotubes), coated (which is defined as a nanotube surrounded by or decorated with clusters of atoms other than carbon), and irradiated (which is defined as the bombardment of nanotubes with particles or photons such as x-rays of energy sufficient to cause inelastic change to the crystal lattice of the nanotube. Such nanotubes may be bound together or with other "support" materials. "Nanostructured"

refers to a structure on a nano-scale (e.g., one billionth of a meter), such as on the atomic or molecular level.

"Chosen from" or "selected from" as used herein refers to selection of individual components or the combination of two (or more) components. For example, the nanostructured material can comprise carbon nanotubes that are only one of impregnated, functionalized, doped, charged, coated, and irradiated nanotubes, or a mixture of any or all of these types of nanotubes such as a mixture of different treatments applied to the nanotubes.

"Nanostructured material" is a material comprising at least one of the above-mentioned carbon nanotube components. Defective carbon nanotubes are those that contain a lattice distortion in at least one carbon ring. A lattice distortion means any distortion of the crystal lattice of carbon nanotube atoms forming the tubular sheet structure. Non-limiting examples include any displacements of atoms because of inelastic deformation, or presence of 5 and/or 7 member carbon rings, or chemical interaction followed by change in $sp^2$ hybridization of carbon atom bonds.

Another aspect of the invention is directed to elongated nanotubes comprising carbon, wherein the nanotube is distorted by crystalline defects, similar to those described above. In this embodiment, the nanotubes are distorted, due to the defects, to a degree that the nanotubes, when treated, have significantly greater chemical activity that allow the nanotube to react with, or bond to, chemical species that would not react with or bond to undistorted and/or untreated nanotubes.

The carbon nanotubes used in the nanostructured material may have a scrolled tubular or non-tubular nano-structure of carbon rings, and may be single-walled, multi-walled, nano-scrolled or combinations thereof.

The carbon nanotubes having a scrolled tubular or non-tubular nano-structure have a morphology chosen from nano-horns, cylinders, nanospirals, dendrites, spider nanotube structures, Y-junction nanotubes, and bamboo morphology.

The above described shapes are more particularly defined in M. S. Dresselhaus, G. Dresselhaus, and P. Avouris, eds. Carbon Nanotubes: Synthesis, Structure, Properties, and Applications, Topics in Applied Physics. Vol. 80. 2000, Springer-Verlag; and "A Chemical Route to Carbon Nanoscrolls, Lisa M. Viculis, Julia J. Mack, and Richard B. Kaner; Science 28 Feb. 2003; 299, both of which are herein incorporated by reference.

In certain embodiments, the three-dimensional nanostructured material may further comprise at least one material chosen from polymers, ceramics, and metals, which may be in a form chosen from fibers, beads, particles, wires, sheets, foils, and combinations thereof.

These materials may be used to support the fabrication of the three-dimensional structure and may become an integral part of the structure. Alternatively, these materials may be sacrificial, meaning that they are removed by subsequent processing, such as a thermal or chemical procedures, to eliminate them from the final structure, while leaving a stable structure comprised almost entirely of carbon nanotubes. The sacrificial support material is generally used in applications that do not require the properties of the support material, such as in certain high strength or armor/ballistic applications.

Non-limiting examples of polymers that can be used in the nanostructured material described herein are chosen from single or multi-component polymers including nylon, polyurethane, acrylic, methacrylic, polycarbonate, epoxy, silicone rubbers, natural rubbers, synthetic rubbers, vulcanized rubbers, polystyrene, aramid, polyethylene, ultra-high-molecular weight polyethylene, high-density polyethylene (HDPE), low-density polyethylene (LDPE), poly(p-fenyl-2, 6-benzobisoxazol), polypropylene, polychloroprene, polyimide, polyamide, polyacrylonitrile, polyhydroaminoester, polyester (polyethylene terephthalate), polybutylene terephthalate, poly-paraphylene terephtalamide, polyester ester ketene, viton fluoroelastomer, polytetrafluoroethylene, and polyvinylchloride.

Non-limiting examples of ceramics that can be used in the nanostructured material described herein include: boron carbide, boron nitride, boron oxide, boron phosphate, beryllium oxide, spinel, garnet, lanthanum fluoride, calcium fluoride, silicon carbide, carbon and its allotropes, silicon oxide, glass, quartz, aluminum oxide, aluminum nitride, zirconium oxide, zirconium carbide, zirconium boride, zirconium nitrite, hafnium boride, thorium oxide, yttrium oxide, magnesium oxide, phosphorus oxide, cordierite, mullite, silicon nitride, ferrite, sapphire, steatite, titanium carbide, titanium nitride, titanium boride, and combinations thereof.

Non-limiting examples of metals that can be used in the nanostructured material described herein include aluminum, boron, copper, cobalt, gold, platinum, silicon, steel, titanium, rhodium, indium, iron, palladium, germanium, tin, lead, tungsten, niobium, molybdenum, nickel, silver, zirconium, yttrium, and alloys thereof.

In one embodiment, at least one of the previously described polymers, ceramics, and metals are coated on the surface of the carbon nanotubes to form a polymer containing layer, a ceramic containing layer, a metal containing layer, or a combination of any or all of these layers. For example, in certain ballistic applications the nanostructured material may comprise at least one layer of boron carbide.

During the processing of the nanostructured material of one aspect of the invention, the resulting structure may comprise 5, 6 and 7-membered carbon rings at the intersection of two or more carbon nanotubes. These different ring structure can lead to distortions in the carbon nanotubes, which tend to aid in the formation of a self-assembling nanostructured material The ability of the nanostructured material to have a a wide-ranging density, for example ranging from 1 picogram/$cm^3$ to 20 g/$cm^3$, such as 1.25 g/$cm^3$, allows the material to be tailored for a variety of applications. Non-limiting examples of articles made from the nanostructured material described herein range from fabrics to structural supports. Electrical, mechanical and thermal properties associated with the carbon nanotube further allow the nanostructured materials to be used in mechanical actuators, heat sink, thermal conductor, or membranes for fluid purification.

For example, because of the high thermal transfer of carbon nanotubes, e.g., about thirty times the thermal conduction of copper, thermal conductors may be used. Alternatively, the insulating properties associated with this material enables blankets, tents, sleeping bags, clothes, and building materials to be constructed from the material described herein. The material can be functionalized to be an insulator by keeping nanotube ends from direct connection. The phonons can not propagate with in the material. Alternatively, by connecting the ends excellent thermal transport is achieved. For example, nanotubes can exhibit up to twice the heat conduction of atomically perfect diamond.

Carbon nanotubes, which are typically 7-10,000 times more electrically conductive than copper, enable materials described herein to be used in conducting or near superconducting applications.

In addition, the high strength associated with carbon nanotubes, about 100 times the tensile strength of steel at $1/6^{th}$ the weight, allows the nanostructured material described herein to be made into puncture resistance applications, such as projectile bombardment or other ballistic mitigation applications. In particular, the nanostructured material described herein exhibits excellent blast mitigation properties, which may be defined in terms of energy adsorbed per unit impact area as a function of the mass of the affected composite material.

In such ballistic mitigation applications, the nanostructured material can primarily comprise carbon nanotubes in a composition containing boron carbide. Alternatively, the nanostructured material can comprise at least one layer of carbon nanotubes and at least one material, such as in an alternating layer configuration with the carbon nanotube layer, chosen from the previously described polymers, ceramics, and metals fused together to form a three-dimensional structure.

For example, boron carbide is a traditional ceramic generally used for blast mitigation materials. The primary drawback of this material is that it is brittle. However, by incorporating boron into the outer shells of a multiwalled carbon nanotubes, it is possible to produce a material that will have the flexibility and strength characteristics of carbon nanotubes and the micro hardness of boron carbide.

To simply incorporate boron into carbon nanotube material in the native form of powder generally yields non-uniformities. To avoid this problem, the Inventors have found it to be advantageous to treat the nanotubes after they have been formed into a nanostructured material with boron carbide to develop a coated or doped nanotubes and said material having a controlled density and porosity.

The boron treatment can be performed by a variety of methods. For example, Chemical Vapor Deposition (CVD) can be used to grow a boron carbide layer surrounding the carbon nanotubes. Alternatively, a hybrid method that uses CVD to deposit boron on the carbon nanotube while the material is irradiated with an electron beam in a range from 80 keV to 1.4 MeV can also be used. In this process, the electron beam provides sufficient energy to react the carbon in the outer walls of the nanotube with the boron to produce boron carbide. Other methods to treat carbon nanotubes with boron carbide include, but are not limited to plasma spray coating and magnetron sputtering.

In general ballistic cloth is a material in a shape of a cloth that will protect personal or equipment from projectile impact. For example, a flexible cloth that can be worn by personnel in a hostile environment. Using one of the methods described herein, a ballistic cloth may be made in which carbon nanotubes and at least one material chosen from the previously described polymers, ceramics, and metals, are present in an amount sufficient to mitigate blast forces from projectiles or explosives coming into contact with the ballistic cloth. This type of material may comprise a component of body armor, vehicle armor, bullet-proof vests, shields, blankets, tents, sleeping bags, cargo containers, shipping containers, storage boxes and containers, building shielding materials, and structural components of vehicles, aircraft, spacecraft, and train cars.

More generally, a fabric made from or comprising the nanostructured material described herein may comprise a garment or article of clothing to be worn or to cover a person or animal, or to cover a vehicle, aircraft, spacecraft, train car, or generally any equipment or structure which may benefit from the mechanical, electrical, and/or thermal properties associated with the carbon nanotube.

Also described herein are methods of making a three-dimensional nanostructure. In one embodiment, the method comprises dispersing nanotubes in an appropriate fluid, with or without surfactants, to form a nanotube aliquot, depositing the nanotube aliquot onto a porous substrate in an amount sufficient to obtain a substantially stable interlocking monolithic structure, and fusing the carbon nanotubes together to form a three dimensional nanostructure.

As used herein "dispersing" comprises ultrasonication or mechanical mixing in a blender. An appropriate fluid for dispersing nanotubes may comprise water, organic solvents, acids, or bases. Non-limiting examples of appropriate organic solvents include ethanol, isopropanol, methanol, and xylene.

As used herein "surfactant" comprises a molecule with two ends: one hydrophobic end and one hydrophilic end. The surfactant enables the nanotubes to disperse in water. A non-limiting example of such a surfactant that can be used in the method described herein is SDS (sodium dodecylsulfate)

In another embodiment, the nanotube aliquot further comprises a support material chosen from the previously described polymers, ceramics, and metals, which may be in a form chosen fibers, beads, particles, wires, sheets, foils, and combinations thereof, and being dispersed with the carbon nanotubes.

When a support material is used, dispersing generally comprises ultrasonication at a level sufficient to cause ultrasonic bonding of the support material alone or with the carbon nanotubes. As stated, these support materials may comprise an integral part of the nanostructured material, or may be sacrificial.

In addition, fusing is typically performed by irradiative, electrical, chemical, thermal, or mechanical processing, either independently or in conjunction with one another. For example, irradiative processing may comprise e-beam irradiation, UV radiation, X-ray, and ionizing radiation. Chemical processing may comprise treating the carbon nanotubes with at least one material chosen from acids, bases, carboxyls, peroxides, and amines for a time sufficient to facilitate fusion of the carbon nanotubes with one another. Similarly, chemical processing may comprise photochemical bonding for a time sufficient to obtain chemical cross linking. As used herein, "cross linking" means that a chemical bond is formed between two or more nanotubes within the carbon nanotube nanostructured material.

In one embodiment, fusing comprises heating the nanostructure in an oven at a temperature below the melting point of the support material. This process can be performed in vacuum, or in an atmosphere chosen from inert gases or air.

In one non-limiting embodiment, the method further comprises the chemical pr physical vapor deposition of at least one material chosen from previously described ceramics, metals, and polymers. During this method, deposition comprises the depositing of at least one of the previously described polymers, ceramics, and metals near the intersecting points of carbon nanotubes.

When fusing occurs through a mechanical process, it can be done through a method chosen from hydraulic pressing, three roll pressing, mechanical grinding. According to a method described herein, the three-dimensional nanostructured material may be thermally or electrically annealed to add further benefits to the structure, such as structural integrity. For example, by passing a current through or by creating eddy currents through electromagnetic field emersion one can cause electro migration in an amount sufficient to fuse nanotubes together, which, depending on the particular conditions (e.g., field strength, nanotube morphology, etc.) can lead not only to the modification of such defects, but can cause defect creation, elimination or migration.

In addition to the above described method, a multi-step recycling method may be used to make a three-dimensional nanostructure. Such a method comprises
(1) growing carbon nanotubes in a reactor;
(2) fusing the grown nanotubes to form a three dimensional nanostructure;
(3) deposition of a catalyst and growth of nanotubes on or within the three-dimensional nanostructure;
(4) repeating (2) to (3) for a time sufficient to achieve a desired thickness, density or property for the three-dimensional nanostructure.

In this type of method, growing of the carbon nanotubes comprises a catalytic CVD process. The process to grow carbon nanotubes typically requires carbon containing vapor to be in presence of catalyst nanoparticles at a temperature sufficient to produce carbon nanotubes.

The method of applying the catalyst in (3) comprises the Chemical Vapor Deposition or Physical Vapor Deposition of catalyst.

The process of applying the catalyst may comprise depositing a metal-organic catalyst layer, such as ferrocene or an iron pentacarbonyl containing layer.

In addition to the previously described multi-step recycling method, a continuous method of making a three-dimensional nanostructure material, may be used. This type of method comprises growing carbon nanotubes, in situ, and fusing the grown carbon nanotubes substantially simultaneously with the growing process. In one embodiment, annealing may also be performed simultaneous with or prior to fusing. As before, annealing may be performed using a thermal or electrical process.

In any of the previously described methods, the carbon nanotubes may be grown with a gas chosen from but not limited to: ethanol, carbon monoxide, xylene, acetylene, and methane. Growth of the carbon nanotubes may be enhanced/improved by depositing a metal-organic catalyst layer, such as ferrocene or iron pentacarbonyl.

Non-limiting examples of the methods used to the manufacture the nanostructure materials described herein include an organic solvent evaporation process, a geometric weave process, a vacuum filtration process, and a nanostructure polymerization process. Each of these processes, including those described in more detail below, can create a nanostructure with nanomaterials embedded on them or composed of them.

To enhance its structural support and binding to other entities, the entire nanostructured material can be coated with the previously mentioned metals, plastics, or ceramics. In addition, structural integrity of the nanostrutured material can be enhance by chemical, electrical, thermal, or mechanical treatment or any combination there of. In non-limiting embodiments, mechanical treatment could involve rolling the material under pressure, electrical treatment could be performed for a time sufficient to perform electro migration, and thermal treatment could be performed for a time sufficient to reach diffusion bonding).

In any of the above-described methods, the starting carbon nanotubes generally contain residual iron particles or other catalytic particles that remain after production of the nanotubes. In certain embodiments, it is desired to wash the carbon nanotubes with a strong oxidizing agent such as acids and/or peroxides or combinations there of before forming a nanostructured material. Upon washing with a strong oxidizing agent, the iron generally found in the carbon nanotubes is oxidized to $Fe^{++}$ and $Fe^{+++}$. In addition, acid washing has the benefit of removing amorphous carbon which interferes with the surface chemistry of the nanotube.

It is also thought that this acid washing procedure contributes to the high degree of hydrophilicity of these functionalized carbon nanotubes and the resulting carbon nanostructured material. The washed carbon nanotubes are generally fabricated into a nanostructured material using one of the following processes. It is noted that any one of the following processes, as well as those described in the following sections, can be used to create a nanostructured material described herein, whether multi or monolayered.

Organic Solvent Evaporation Process

In the Organic Solvent Evaporation Process, a nanostructure material, such as a fluid sterilization membrane, can be made by bonding nanomaterials with an adhesive. Examples of fluid sterilization membranes that can be made in accordance with method described herein can be found in co-pending U.S. patent application No. 10/794,056, filed Mar. 8, 2004, which is herein incorporated by reference. Examples of adhesives are chemical adhesives, such as glue.

According to this process, carbon nanotubes can be mixed with a organic solvent, such as methanol, ethanol, isopropanol or xylene. In one embodiment, this dispersion is next placed in an ultrasonic bath for a time sufficient to exfoliate the carbon nanotubes. The resulting dispersion is next poured onto porous substrate to remove organic solvent. Additionally, other polymers or polymeric materials may be added to the organic solvent to enhance the resulting said nanostrutured materials physical or mechanical properties.

Deposition Process

In this process, a nanostructured material can be made by vacuum deposition of carbon nanotube dispersions to lay down layers of carbon nanotubes on at least one substrate. Ultrasonication using a "Branson 900B" Model at 80% to 100% power may be used to aid in dispersing and/or deagglomerating carbon nanotubes during deposition.

An envisioned process of the deposition method comprises placing carbon nanotubes in a suitable organic solvent or water and ultrasonicating using a "Branson 900B" Model at 80% to 100% power for a time sufficient to disperse the carbon nanotubes during deposition. The solution can be placed in a vacuum filtration device equipped with ultrasonication to further ensure that the carbon nanotubes are deagglomerated.

Fabrication of One Boron Carbide Nanostructure Material

In one embodiment, blast mitigation materials comprising the nanostructured material described herein and boron carbide can be fabricated. For example, a multilayer ballistic material can be made by first starting with multi-walled carbon nanotubes up to 1000 microns in length and 50 nm in width. As used in this embodiment, "multi-walled" means up to 25 walls. This morphology of carbon nanotube can be mixed in a 1:1 ratio with a sacrificial material, such a calcium oxide support fibers 1 mm in length and 100 nm in width.

Different boron sources, such as boron carbonyl or diborane, may be used to coat the carbon nanotube/calcium oxide mixture using a chemical vapor deposition (CVD) process. For example, when boron carbonyl is used, a CVD temperature ranging from 600° C. to 750° C., such as 700° C. can be used. Once the nanotubes have been coated with boron then the boron carbide can be formed by raising the temperature to 1100° C. When diborane is used, a higher CVD temperature, such as one ranging from 900° C. to 1200° C., such as 1100° C. can be used. In either case, a CVD pressure of 100 mT is generally sufficient to treat the carbon nanotubes and develop the desired boron carbide coating.

Other methods of deposition boron to form a boron carbide layer includes physical vapor deposition (PVD) or boron implantation, typically at 120 keV to 1.4 MeV (100 to 1,000 atoms per square nanometer). Ion implantation is generally used when surface implantation is desired.

When relevant, crosslinking of the nanostructured material can take place via electrical, chemical or thermal processing. For example, an e-beam process can be used to generate an energy flux of 130 keV (10 particles/nanometer), which should be sufficient for crosslinking the nanostructured material.

Any of the above process can be used in either a batch or continuous method of making a boron carbide/carbon nanotube nanostructured material. When used in a continuous process, it is envisioned that the speed of production can approach or even exceed the industry standard of 100 feet per minute.

Additional general variables that may be used to fabricate a boron carbide nanostructured material described herein is shown in the following table.

TABLE 1

Variables Used in Nanostructured Fabrication Method

| Method Choices | Element Choice | Variable | Range Low | High |
|---|---|---|---|---|
| Starting Material | Morphology of carbon fibers | Length | 1 um | 1000 km |
| | | Width (nW) | 10 nm | 10 um |
| | | # of walls | 10 | 1000 |
| | Choice and morphology of support fibers | Composition | Ceramic | Metal |
| | | Length | 10 um | 100 m |
| | | Width sW | sW = 2x(nW) | sW = 10x(nW) |
| | | Sacrificial | Yes/No | |
| | Ratio of cnt to support | Cnt:support | 100:1 | 1:100 |
| CVD | Temperature | Pure Boron Vapor | 1900° C. | 2500° C. |
| | | Boron Carbonyl | 600° C. | 750° C. |
| | | Diborane | 900° C. | 1200° C. |
| | CVD Pressure | Boron Carbonyl | 1 mT | 600 mT (*) |
| | | Diborane | 1 mT | 600 mT (*) |
| | CVD Exposure time | Diborane | 10 min | 1 hr |
| | | Boron Carbonyl | 10 min | 1 hr |
| PVD | Deposition | Deposition layer thickness | 1 atomic Layer | 5,000,000 atomic Layers |
| | Temperature | Nanostructured Material temperature | 25° C. | 500° C. |
| | Boron Implantation | Energy-Flux | 80 keV-1 fx | 200 keV-1000 fx |
| Process Choices | Batch | Size of batch | 1 (mm)³ | 100 (m)³ |
| | Continuous Reel to Reel | Speed of production | 0.01 f/m | 1000 f/m |
| Crosslinking | Linear E-Beam | Energy-flux | 0.01 f/m | 1000 f/m | wherein,

| | |
|---|---|
| cnt = | Carbon nanotubes |
| fx = | particles/nanometer |
| keV = | kilo electron volts |
| f/m = | feet per minute |
| (*) = | molecular flow |
| mT = | mlTorr |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

What is claimed is:

1. A method of making a flexible, three-dimensional nanostructure, said method comprising:

treating carbon nanotubes with at least one chemical chosen from acids, bases, carboxyls, peroxides, and amines to form treated carbon nanotubes;

dispersing said treated carbon nanotubes and fibers comprising at least one material chosen from polymers, ceramics, metals and combinations thereof, in an appropriate fluid to form a carbon nanotube containing aliquot;

depositing said carbon nanotube containing aliquot onto a porous, flexible substrate; and fusing said carbon nanotubes together to form a flexible, three dimensional nanostructure.

2. The method of claim 1, wherein said dispersing comprises ultrasonication, mechanical mixing in a blender, or combinations thereof.

3. The method of claim 1, wherein said carbon nanotube containing aliquot further comprises at least one material selected from the group consisting of beads, particles, wires, sheets, foils, and combinations thereof.

4. The method of claim 1, wherein said polymers are chosen from single or multi-component polymers.

5. The method of claim 4, wherein said single or multi-component polymers are chosen from nylon, polyurethane, acrylic, methacrylic, polycarbonate, epoxy, silicone rubbers, natural rubbers, synthetic rubbers, vulcanized rubbers, polystyrene, aramid, polyethylene, ultra-high-molecular weight polyethylene, high-density polyethylene (HDPE), low-density polyethylene (LDPE), poly(p-fenyl-2,6-benzobisoxazol), polypropylene, polychloroprene, polyimide, polyamide, polyacrylonitrile, polyhydroaminoester, polyester (polyethylene terephthalate), polybutylene terephthalate, poly-paraphylene terephtalamide, polyester ester ketene, viton fluoroelastomer, polytetrafluoroethylene, and polyvinylchloride.

6. The method of claim 1, wherein said ceramics are chosen from at least one of the following: boron carbide, boron nitride, boron oxide, boron phosphate, beryllium oxide, spinel, garnet, lanthanum fluoride, calcium fluoride, silicon carbide, carbon and its allotropes, silicon oxide, glass, quartz, aluminum oxide, aluminum nitride, zirconium oxide, zirconium carbide, zirconium boride, zirconium nitrite, hafnium boride, thorium oxide, yttrium oxide, magnesium oxide, phosphorus oxide, cordierite, mullite, silicon nitride, ferrite, sapphire, steatite, titanium carbide, titanium nitride, titanium boride, and combinations thereof.

7. The method of claim 1, wherein said metals are chosen from at least one of the following: aluminum, boron, copper, cobalt, gold, platinum, silicon, steel, titanium, rhodium, indium, iron, palladium, germanium, tin, lead, tungsten, niobium, molybdenum, nickel, silver, zirconium, yttrium, and alloys thereof.

8. The method of claim 1, wherein said dispersing comprises ultrasonication at a level sufficient to cause ultrasonic binding of the support material alone or with the carbon nanotubes.

9. The method of claim 1, wherein said appropriate fluid comprises water, organic solvents, acids, or bases.

10. The method of claim 9, wherein said organic solvents comprise ethanol, isopropanol, methanol, or xylene.

11. The method of claim 1, wherein said fusing is performed by irradiative, electrical, chemical, thermal, or mechanical processing, either independently or in conjunction with one another.

12. The method of claim 11, wherein said irradiative processing comprises E-beam irradiation, Ultra Violet radiation, X-ray radiation, or Plasma radiation.

13. The method of claim 11, wherein said chemical processing comprises further treating the carbon nanotubes with at least one chemical chosen from acids, bases, carboxyls, peroxides, and amines prior to or simultaneous with said fusion.

14. The method of claim 11, wherein said chemical processing comprises photochemical bonding for a time sufficient to obtain chemical cross linking.

15. The method of claim 11, wherein said thermal processing comprises heating the nanostructure in an oven at a temperature below the melting point of the support material.

16. The method of claim 15, wherein heating is performed in vacuum, or in an atmosphere chosen from inert gases or air.

17. The method of claim 1, further comprising chemical or physical vapor deposition of at least one material chosen from ceramics, metals, and polymers.

18. The method of claim 17, wherein said polymers are chosen from single or multi-component polymers.

19. The method of claim 18, wherein said single or multi-component polymers are chosen from nylon, polyurethane, acrylic, methacrylic, polycarbonate, epoxy, silicone rubbers, natural rubbers, synthetic rubbers, vulcanized rubbers, polystyrene, aramid, polyethylene, ultra-high-molecular weight polyethylene, high-density polyethylene (HDPE), low-density polyethylene (LDPE), poly(p-fenyl-2,6-benzobisoxazol), polypropylene, polychloroprene, polyimide, polyamide, polyacrylonitrile, polyhydroaminoester, polyester (polyethylene terephthalate), polybutylene terephthalate, poly-paraphylene terephtalamide, polyester ester ketene, viton fluoroelastomer, polytetrafluoroethylene, and polyvinylchloride.

20. The method of claim 17, wherein said ceramics are chosen from at least one of the following: boron carbide, boron nitride, boron oxide, boron phosphate, beryllium oxide, spinel, garnet, lanthanum fluoride, calcium fluoride, silicon carbide, carbon and its allotropes, silicon oxide, glass, quartz, aluminum oxide, aluminum nitride, zirconium oxide, zirconium carbide, zirconium boride, zirconium nitrite, hafnium boride, thorium oxide, yttrium oxide, magnesium oxide, phosphorus oxide, cordierite, mullite, silicon nitride, ferrite, sapphire, steatite, titanium carbide, titanium nitride, titanium boride, and combinations thereof.

21. The method of claim 17, wherein said metals are chosen from at least one of the following: aluminum, boron, copper, cobalt, gold, platinum, silicon, steel, titanium, rhodium, indium, iron, palladium, germanium, tin, lead, tungsten, niobium, molybdenum, nickel, silver, zirconium, yttrium, and alloys thereof.

22. The method of claim 17, wherein said deposition comprises the depositing of at least material chosen from polymers, ceramic, and metals near the intersecting points of carbon nanotubes.

23. The method of claim 11, wherein said mechanical processing comprises at least one method chosen from hydraulic pressing, three roll pressing, mechanical grinding.

24. The method of claim 1, further comprising annealing the three-dimensional nanostructured material.

25. The method of claim 1, further comprising a process for removing non-connected or non-fused carbon nanotubes from the nanostructured material.

26. The method of claim 25, wherein said process for removing non-connected or non-fused carbon nanotubes from the nanostructured material comprises electric annealing.

27. The method of claim 1, wherein said appropriate fluid further comprises a surfactant.

28. The method of claim 27, wherein said surfactant comprises sodium dodecylsulfate.

* * * * *